United States Patent Office 3,153,050
Patented Oct. 13, 1964

3,153,050
SPIRO[DIBENZO[a,d][1,4]CYCLOHEPTADIENE-5,
ALPHA-SUCCINIMIDE]
Martin A. Davis, Montreal, Quebec, Canada, assignor to American Home Products Corporation, New York, N.Y., a corporation of Delaware
No Drawing. Filed May 14, 1962, Ser. No. 194,651
4 Claims. (Cl. 260—326.5)

This invention relates to a novel chemical compound, its method of preparation and the chemical intermediates used therein.

More particularly, my new chemical compound is a succinimide derivative containing a dibenzocycloheptadiene ring, the two being linked together in such a manner as to form a spiro ring system. In particular the new compound is spiro[dibenzo[a,d][1,4]cycloheptadiene-5, α-succinimide], and it may be represented by structural formula:

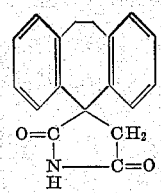

My novel succinimide derivative is characterized by possessing a high order of anticonvulsant action together with a low order of toxicity. Thus, when administered to experimental animals by the oral route, it is highly effective in inhibiting the effects produced by the application of electroshock. The dosages at which it elicits this effect are well below those causing toxic manifestations. A surprising and unexpected property of the compound is a very marked ability to antagonize the convulsive effects of metrazole. This is surprising, as the somewhat related α,α-diphenylsuccinimide has been reported by Miller and Long [J. Amer. Chem. Soc., 73, 4895 (1951)] to be virtually devoid of antimetrazole activity.

In view of these biological properties, my novel succinimide derivative is useful as a therapeutic agent in the treatment of a variety of convulsive disorders. For the treatment of such disorders it may be administered orally to patients in dosage forms such as tablets or capsules, containing the active ingredient in quantities of 100 to 400 mg., together with excipients such as lactose, starch, magnesium stearate, and the like, in total daily doses of from 100 to 1,000 mg.

The novel succinimide derivative is readily obtained by treatment of 5-carboxymethyl-5-cyanodibenzo[a,d][1,4] cycloheptadiene with boiling concentrated hydrochloric acid. Similar conditions have been used by C. A. Miller and L. M. Long (loc. cit.) to form α,α-diphenylsuccinic acid from β-cyano-β,β-diphenylpropionic acid, i.e. a hydrolysis of a cyano to a carboxylic acid group.

Contrary to expectations, treatment of 5-carboxymethyl-5-cyanodibenzo[a,d][1,4]cycloheptadiene with hydrochloric acid does not give the corresponding succinic acid as major product. Instead, the desired succinimide is obtained directly in a crude form. This is readily separated from any unwanted by-product by slurrying the crude reaction product with dilute sodium bicarbonate solution, in which the desired product is insoluble. Recrystallization of this insoluble material from an appropriate solvent then gives the purified succinimide.

The intermediate 5-cyano compound, 5-carboxymethyl-5-cyanodibenzo[a,d][1,4]cycloheptadiene, may be prepared by the condensation of 5-cyanodibenzo[a,d][1,4] cycloheptadiene with an alkyl α-haloacetate under the influence of an alkaline condensing agent and in an inert organic solvent. In practice I prefer to use, as the ester, ethyl chloroacetate. Alkaline condensing agents which may be employed are the alkali metal amides, as for example, sodium or lithium amide, but as regards high reactivity and ease of manipulation I prefer to use the commercially-available sodium hydride dispersion in mineral oil.

As solvents for use in the reaction, toluene has been found to be quite satisfactory and the reaction is completed by operating at the boiling point of this solvent. Other solvents which may also be employed are related hydrocarbons, as for example, benzene or xylene.

The immediate product of the reaction, i.e. the ethyl ester of 5-carboxymethyl-5-cyanodibenzo[a,d][1,4]cycloheptadiene, is obtained as an oil which is not characterized as such. Instead it is hydrolyzed under mild conditions to yield, 5-carboxymethyl-5-cyanodibenzo[a,d][1,4]cycloheptadiene, suitable conditions being, for example, the action of potassium hydroxide dissolved in aqueous ethanol. The product, being soluble in alkali, is readily separated from the neutral contaminants present in the original mixture.

The starting material, 5-cyanodibenzo[a,d][1,4]cycloheptadiene, may be readily prepared by the action of silver cyanide on 5-chlorodibenzo[a,d][1,4]cycloheptadiene in boiling anhydrous acetonitrile, as described in a copending application of Martin A. Davis and Stanley O. Winthrop, Ser. No. 176,783, filed March 1, 1962.

The reactions involved may be represented as follows:

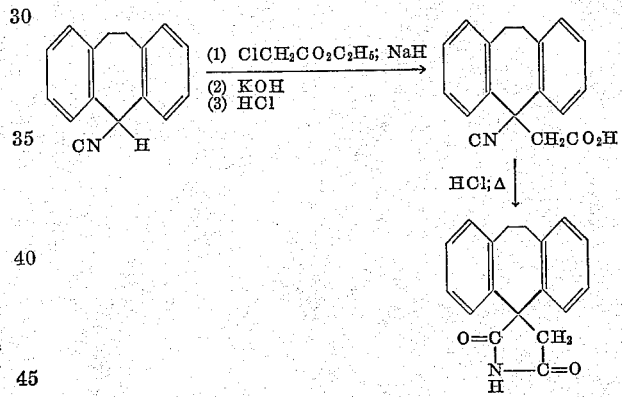

The following examples are illustrative of my invention.

Example 1

Sodium hydride in oil (53.8% dispersion; 2.44 grams, 0.055 mole) was added to dry toluene (50 milliliters) followed by 5-cyanodibenzo[a,d][1,4]cycloheptadiene (11.0 grams, 0.05 mole) in toluene (50 milliliters). The mixture was stirred and heated under reflux for two hours to complete the formation of the sodium salt. It was cooled to room temperature, treated dropwise with a solution of ethyl chloroacetate (9.2 grams, 0.075 mole) in toluene (20 milliliters), and heated under reflux for a further two and one-half hours. Filtration was effected using Celite (diatomaceous earth), and the filtrate was washed with water, dried and evaporated, giving 13.3 grams of an oil which could not be induced to solidify.

This oil was then heated under reflux for fifteen minutes with potassium hydroxide (8.0 grams) in 50% aqueous ethanol. The alcohol was removed in vacuo i.e. at a pressure below atmospheric, and the aqueous layer, after dilution with water, was extracted with ether and acidified. The precipitate thus obtained was recrystallized from aqueous ethanol to give 6.0 grams of 5-carboxymethyl-5-cyanodibenzo[a,d][1,4]cycloheptadiene; M.P. 173–174° C.

Analysis confirmed the empiric formula $C_{18}H_{15}NO_2$. Required: C, 77.96; H, 5.45; N, 5.05%. Found: C, 78.18; H, 5.53; N, 5.01, 5.08%.

*Example 2*

A mixture of the above product, 5-carboxymethyl-5-cyanodibenzo[a,d][1,4]cycloheptadiene, (5.1 grams) and concentrated hydrochloric acid (100 milliliters) was stirred and heated under reflux for one and one-half hours. A granular precipitate was formed. An equal volume of water was then added and the solid was filtered off and dried. There were thus obtained 5.1 grams of crude material; M.P. 195–206° C. This was purified by slurrying in dilute sodium bicarbonate solution and recrystallizing the insoluble portion from ethanol. In this manner there was obtained the desired new chemical compound, spiro[dibenzo[a,d][1,4]cycloheptadiene-5,α-succinimide], as short white needles; M.P. 218–219° C.

Analysis confirmed the empiric formula $C_{18}H_{15}NO_2$. Required: C, 77.96; H, 5.45; N, 5.05%. Found: C, 77.57; H, 5.56; N, 5.08, 4.99%.

I claim:

1. Spiro[dibenzo[a,d][1,4]cycloheptadiene-5,α-succinimide].

2. 5-carboxymethyl - 5 - cyanodibenzo[a,d][1,4]cycloheptadiene.

3. The process of preparing spiro[dibenzo[a,d][1,4]cycloheptadiene-5,α-succinimide], which comprises treating 5-carboxymethyl - 5 - cyanodibenzo[a,d][1,4]cycloheptadiene with boiling concentrated hydrochloric acid.

4. The process of preparing spiro[dibenzo[a,d][1,4]cycloheptadiene-5,α-succinimide] which comprises condensing 5-cyanodibenzo[a,d][1,4]cycloheptadiene with ethyl chloroacetate in the presence of an alkaline condensing agent selected from the group consisting of sodium amide, lithium amide and sodium hydride in an inert hydrocarbon solvent; subjecting the resulting product to hydrolysis under mild hydrolyzing conditions by refluxing with a solution of potassium hydroxide in aqueous ethanol, thereby forming 5-carboxymethyl-5-cyanodibenzo[a,d][1,4]cycloheptadiene; and treating said last-named compound with boiling concentrated hydrochloric acid.

References Cited in the file of this patent

UNITED STATES PATENTS 2,911,412  Scheurer et al. _____ Nov. 3, 1959